(12) United States Patent
Nicholson et al.

(10) Patent No.: US 12,457,374 B2
(45) Date of Patent: Oct. 28, 2025

(54) PLAYING MEDIA CONTENT IN RESPONSE TO TRIGGERS

(71) Applicant: GOOGLE LLC, Mountain View, CA (US)

(72) Inventors: Stuart James Myron Nicholson, Waterloo (CA); Steven Benjamin Goldberg, Los Altos Hills, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/260,730

(22) PCT Filed: Feb. 1, 2021

(86) PCT No.: PCT/US2021/070107
§ 371 (c)(1),
(2) Date: Jul. 7, 2023

(87) PCT Pub. No.: WO2022/164573
PCT Pub. Date: Aug. 4, 2022

(65) Prior Publication Data
US 2024/0064362 A1 Feb. 22, 2024

(51) Int. Cl.
*H04N 21/41* (2011.01)
*H04N 21/262* (2011.01)
*H04N 21/482* (2011.01)

(52) U.S. Cl.
CPC . *H04N 21/41265* (2020.08); *H04N 21/26258* (2013.01); *H04N 21/4825* (2013.01)

(58) Field of Classification Search
CPC ....... H04N 21/41265; H04N 21/26258; H04N 21/4825; H04N 21/854; H04N 21/43615;
(Continued)

(56) References Cited

U.S. PATENT DOCUMENTS

| 8,363,009 B1 | 1/2013 | Queru |
| 8,640,174 B2 * | 1/2014 | Salkintzis ............. H04L 47/762 725/62 |

(Continued)

FOREIGN PATENT DOCUMENTS

| CN | 102597997 A | 7/2012 |
| JP | 2004013527 A | 1/2004 |

(Continued)

OTHER PUBLICATIONS

International Search Report and Written Opinion for PCT Application No. PCT/US2021/070107, mailed on Oct. 5, 2021, 11 pages.

*Primary Examiner* — Amy Onyekaba
(74) *Attorney, Agent, or Firm* — Brake Hughes Bellermann LLP

(57) ABSTRACT

A non-transitory computer-readable storage medium can comprise instructions stored thereon. When executed by at least one processor, the instructions can be configured to cause a mobile computing device to receive, from a companion device, multiple files, each of the multiple files including at least media content, a trigger condition, and an action to be performed upon satisfaction of the trigger condition. The action included in at least one of the files can include playing media content from another one of the multiple files. The instructions can be further configured to cause the mobile computing device to play the media content included in at least one of the multiple files, receive at least one additional file from the companion device, erase at least one of the multiple files, and play media content included in the at least one additional file.

17 Claims, 10 Drawing Sheets

(58) Field of Classification Search
CPC .. G06F 3/04883; G06F 16/4387; G06F 16/70; G06F 16/73
See application file for complete search history.

(56) References Cited

U.S. PATENT DOCUMENTS

| | | | | |
|---|---|---|---|---|
| 9,996,224 | B2* | 6/2018 | Fisher | G06F 3/0484 |
| 10,271,093 | B1* | 4/2019 | Jobanputra | H04N 21/835 |
| 10,362,094 | B2* | 7/2019 | Panguluri | H04L 67/10 |
| 10,433,023 | B1* | 10/2019 | Joliveau | H04N 21/2385 |
| 10,735,489 | B1* | 8/2020 | Joliveau | H04L 65/1083 |
| 10,904,617 | B1* | 1/2021 | Labarre | H04N 21/233 |
| 10,909,172 | B2* | 2/2021 | Zhang | G06F 16/639 |
| 11,375,254 | B2* | 6/2022 | Takemoto | H04N 21/43615 |
| 11,669,568 | B2* | 6/2023 | Chen | G11B 27/102 700/94 |
| 2009/0150553 | A1* | 6/2009 | Collart | H04L 65/612 709/229 |
| 2010/0189424 | A1 | 7/2010 | Doehla et al. | |
| 2010/0262618 | A1 | 10/2010 | Hedinsson et al. | |
| 2011/0134738 | A1* | 6/2011 | Pugsley | G11B 27/034 369/84 |
| 2014/0115115 | A1* | 4/2014 | Kuang | H04N 21/8456 709/219 |
| 2015/0100885 | A1* | 4/2015 | Riley | G06F 3/04883 715/720 |
| 2015/0135284 | A1* | 5/2015 | Bogard | H04L 63/107 726/5 |
| 2016/0238402 | A1* | 8/2016 | McGavran | G01C 21/3626 |
| 2016/0294918 | A1* | 10/2016 | Walline | G06F 21/6218 |
| 2017/0012921 | A1* | 1/2017 | Barker | H04L 67/01 |
| 2017/0024779 | A1* | 1/2017 | Nikolaiev | H04L 67/535 |
| 2017/0041372 | A1* | 2/2017 | Hosur | H04N 21/85406 |
| 2017/0091201 | A1* | 3/2017 | Chabot | G06F 16/122 |
| 2017/0155976 | A1* | 6/2017 | Chung | H04N 21/8545 |
| 2017/0255698 | A1* | 9/2017 | Zhang | G06F 16/4387 |
| 2017/0262896 | A1 | 9/2017 | Tsai et al. | |
| 2017/0331869 | A1 | 11/2017 | Bendahan et al. | |
| 2018/0196760 | A1 | 7/2018 | Pugsley et al. | |
| 2018/0287909 | A1* | 10/2018 | Lewis | G06Q 30/02 |
| 2019/0281098 | A1* | 9/2019 | Wang | G11B 27/10 |
| 2020/0287862 | A1 | 9/2020 | Ledwith et al. | |
| 2020/0351331 | A1* | 11/2020 | Panguluri | G06F 16/4387 |
| 2021/0141892 | A1* | 5/2021 | Chambon-Cartier | G06F 21/46 |
| 2022/0019612 | A1* | 1/2022 | Curicio Lindström | G06F 16/4387 |
| 2022/0239715 | A1* | 7/2022 | Alsina | H04N 21/4532 |
| 2023/0029382 | A1* | 1/2023 | Yoden | H04N 21/47217 |
| 2023/0195334 | A1* | 6/2023 | Lintz | G06F 3/061 711/154 |
| 2024/0251019 | A1* | 7/2024 | Vedula | H04L 9/3213 |

FOREIGN PATENT DOCUMENTS

| | | |
|---|---|---|
| JP | 2008109601 A | 5/2008 |
| JP | 2010154006 A | 7/2010 |
| JP | 2019531019 A | 10/2019 |

* cited by examiner

PLAYING MEDIA CONTENT IN RESPONSE TO TRIGGERS

CROSS REFERENCE TO RELATED APPLICATION

This application is a 35 U.S.C. § 371 National Phase Entry Application from PCT/US2021/070107, filed Feb. 1, 2021, designating the U.S., the disclosure of which is incorporated herein by reference in its entirety.

TECHNICAL FIELD

This description relates to playing media content.

BACKGROUND

Some computing devices, such as smartwatches, can have limited computing resources, such as battery power and/or memory. The limited computing resources can constrain the media content that the computing device is ready to play.

SUMMARY

A non-transitory computer-readable storage medium can comprise instructions stored thereon. When executed by at least one processor, the instructions can be configured to cause a mobile computing device to receive, from a companion device, multiple files, each of the multiple files including at least media content, a trigger condition, and an action to be performed upon satisfaction of the trigger condition. The action included in at least one of the files can include playing media content from another one of the multiple files. The instructions can be further configured to cause the mobile computing device to play the media content included in at least one of the multiple files, receive at least one additional file from the companion device, erase at least one of the multiple files, and play media content included in the at least one additional file.

A non-transitory computer-readable storage medium comprising instructions stored thereon. When executed by at least one processor, the instructions can be configured to cause a mobile computing device to receive, from a companion device, at least a first file, a second file, and a third file, play first media content, receive input associated with a second trigger field, in response to receiving input associated with the second trigger field, play second media content, receive input associated with a fourth trigger field, and in response to receiving input associated with the fourth trigger field, play third media content. The first file can include the first media content, a first trigger field associated with a first action performed by the computing device, the first action not being associated with the second file or the third file, and the second trigger field associated with the second file. The second file can include the second media content, a third trigger field associated with a second action performed by the computing device, the second action not being associated with the first file or the third file, and the fourth trigger field associated with the third file. The third file can include third media content.

A non-transitory computer-readable storage medium can include instructions stored thereon. When executed by at least one processor, the instructions can be configured to cause a companion device to send, to a mobile computing device, at least a first file, a second file, and a third file, receive, from the mobile computing device, an indication of an active file on the computing device, determine, based on the indication of the active file and files stored on the computing device, that last media content will be played on the computing device within a threshold time; and based on determining that the last media content will be played on the computing device within the threshold time, send at least a fourth file to the computing device, the fourth file including fourth media content. The first file can include first media content, a first trigger field associated with a first action performed by the computing device, the first action not being associated with the second file or the third file, and a second trigger field associated with the second file. The second file can include second media content, a third trigger field associated with a second action performed by the computing device, the second action not being associated with the first file or the third file, and a fourth trigger field associated with the third file. The third file can include third media content;

A mobile computing device can include at least one processor and a non-transitory computer-readable storage medium comprising instructions stored thereon. When executed by at least one processor, the instructions can be configured to cause the mobile computing device to receive, from a companion device, at least a first file, a second file, and a third file, play first media content, receive input associated with a second trigger field, in response to receiving input associated with the second trigger field, play second media content, receive input associated with a fourth trigger field, and in response to receiving input associated with the fourth trigger field, play third media content. The first file can include the first media content, a first trigger field associated with a first action performed by the computing device, the first action not being associated with the second file or the third file, and the second trigger field associated with the second file. The second file can include the second media content, a third trigger field associated with a second action performed by the computing device, the second action not being associated with the first file or the third file, and the fourth trigger field associated with the third file. The third file can include third media content.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Some computing devices, such as wearable computing devices including smartwatches, have limited computing resources, such as battery power and/or memory. The limited computing resources can constrain the media content that the computing devices is ready to play.

A companion device, such as a smartphone in communication with the computing device via a personal area network (PAN) or a wireless local area network (WLAN) or a server in communication with the computing device via the Internet, can provide and/or send files to the computing device. The files can include media content, such as audio and/or video content, that the computing device can play. The files can also include metadata, such as identifiers of the files, schedules and/or times when the computing device will play the media content, and/or triggers. The triggers can include input, such as user input, and can be associated with actions, such as turning a display of the computing device off, scrolling through the media content, and/or playing the media content included in another file.

The computing device can generate, and/or receive from the companion device, a chain and/or graph linking files to other files for which the media content will be played in response to triggers. When the computing device is nearing an end of the chain, and/or will have no more media content to play within a threshold time and therefore needs additional files, the companion device can send additional files to the computing device. The computing device can erase files that are unlikely to be replayed (or played at all, depending on the path of files previously taken by the computing device), and store the new files. The computing device can play content already stored on the computing device while waiting for the additional files from the companion device, hiding the latency from the user.

Figure 1:
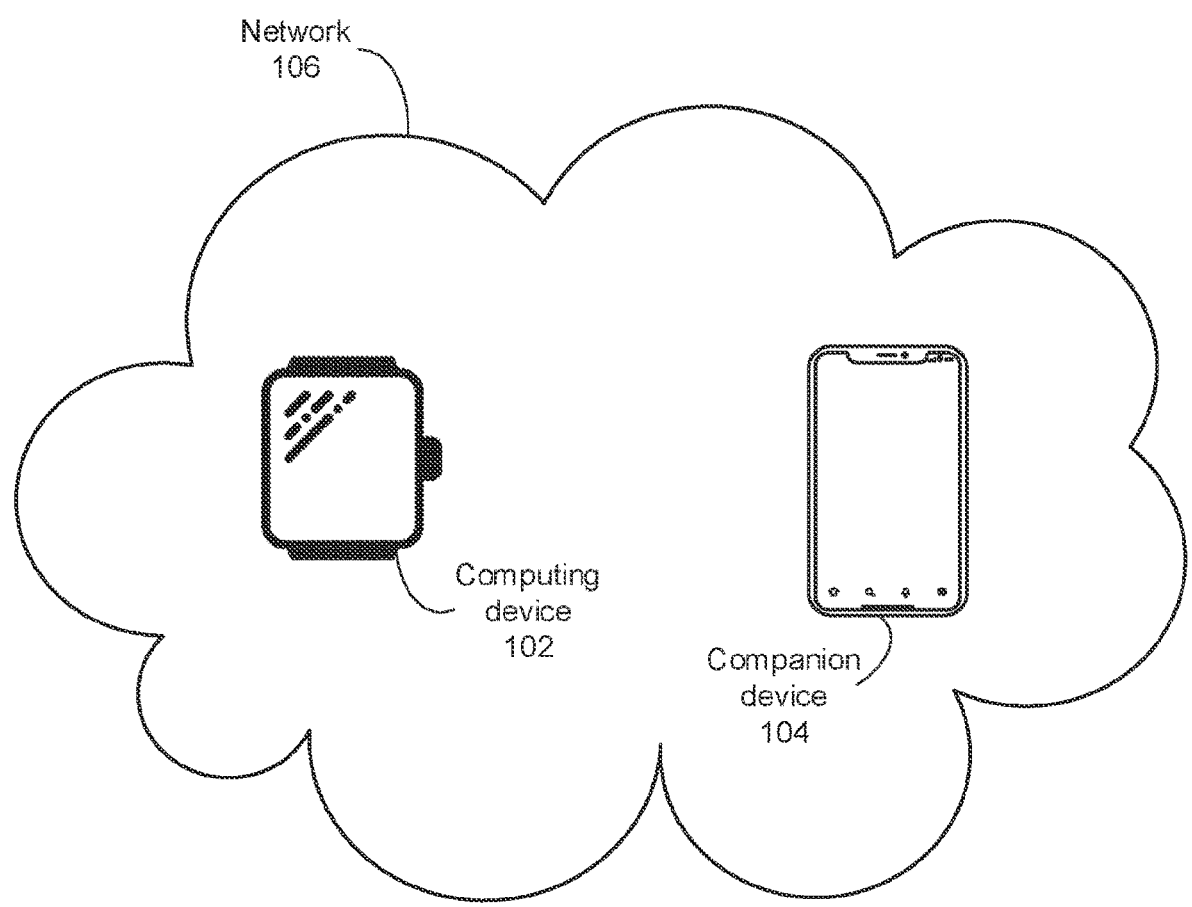
FIG. 1 is a network diagram showing a computing device and a companion device.

FIG. 1 is a network diagram showing a computing device 102 and a companion device 104. In some examples, the computing device 102 can include a mobile computing device and/or a wearable computing device, such as a smartwatch or a pair of smartglasses. The example of a smartwatch can include bands or straps extending from a case. The case can support a display, and the case and display can enclose a processor and memory. The example of a pair of smartglasses can include a pair of lenses supported by rims or frames, temples rotatably and/or flexibly attached to the rims or frames, and a processor and memory supported by the rims, frames, and/or temples. The computing device 102 can include at least one output node and/or output device for playing media content, such as a speaker and/or a display. The computing device 102 can include a clock, against which a schedule can be checked for playing media content at scheduled and/or predetermined times. The computing device 102 can include at least one input node, such as a touchscreen, one or more buttons, and/or sensors for receiving input that can be compared to triggers stored in files.

The computing device 102 can determine media content to play, and/or actions to perform, in response to triggers stored in files received from the companion device 104. The computing device 102, which can be considered a target device, can generate and/or store chains of media content to play, and/or actions to perform, in response to triggers, based on metadata included in the files.

The computing device 102 can communicate with the companion device 104 via a network 106. The network 106 can include a personal area network (PAN) such as an Institute of Electrical and Electronics Engineers (IEEE) 802.15 ("Bluetooth") network, a wireless local area network (WLAN), such as an IEEE 802.11 ("Wireless Fidelity") network, the Internet, or the computing device 102 and the companion device 104 can communicate with each other directly via a peer-to-peer protocol, as non-limiting examples.

The companion device 104 can store and send files to the computing device 102. The companion device 104 can include a mobile computing device such as a smartphone, for example, or any computing device such as a desktop computer or a server, as non-limiting examples.

Figure 2A:
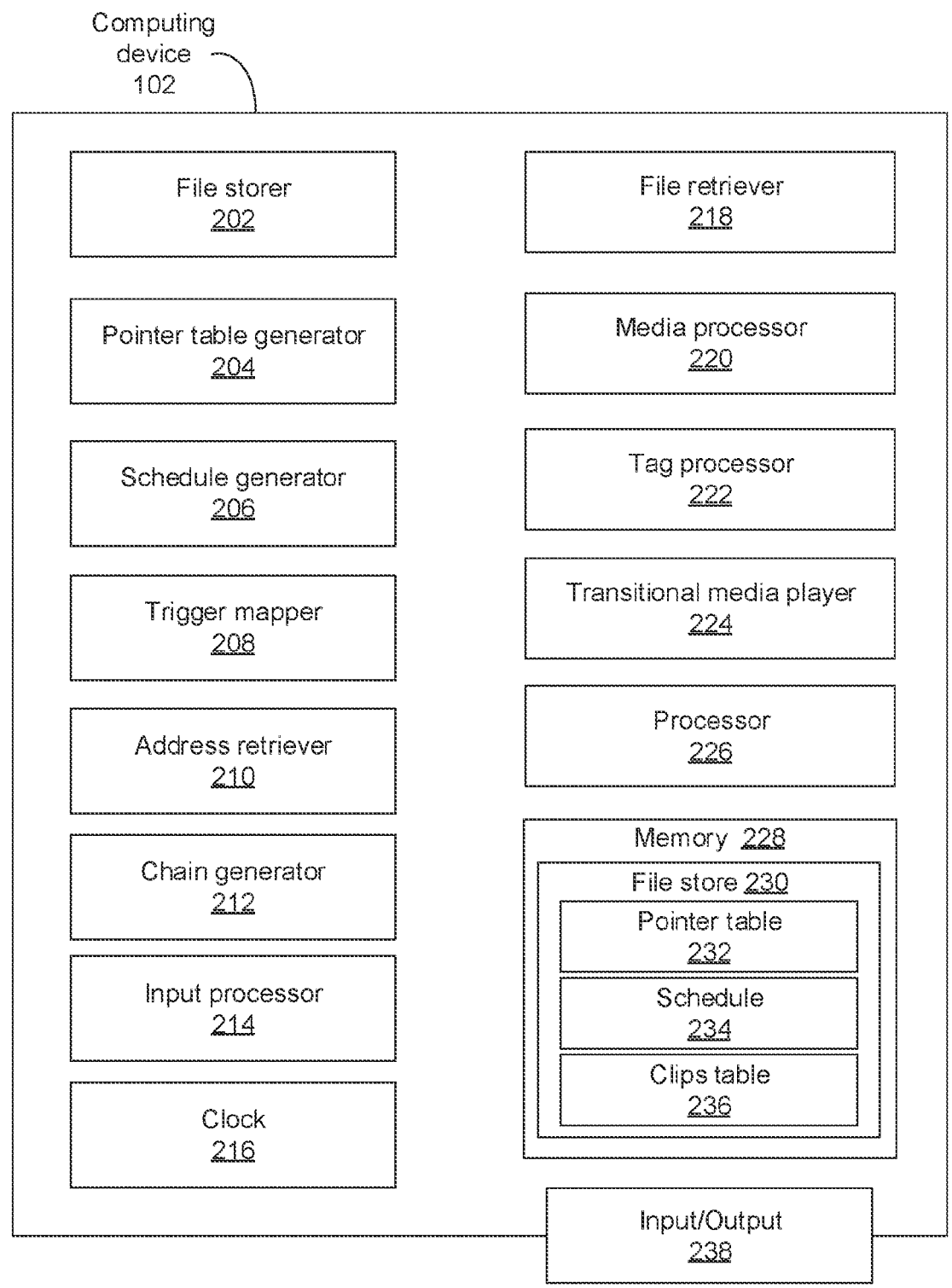
FIG. 2A is a block diagram showing the computing device.

FIG. 2A is a block diagram showing the computing device 102. The computing device 102 can receive files from the companion device 104 (not shown in FIG. 2A), determine actions to perform based on metadata stored in the files, and perform the actions, such as playing media content included in the files.

Figure 3:
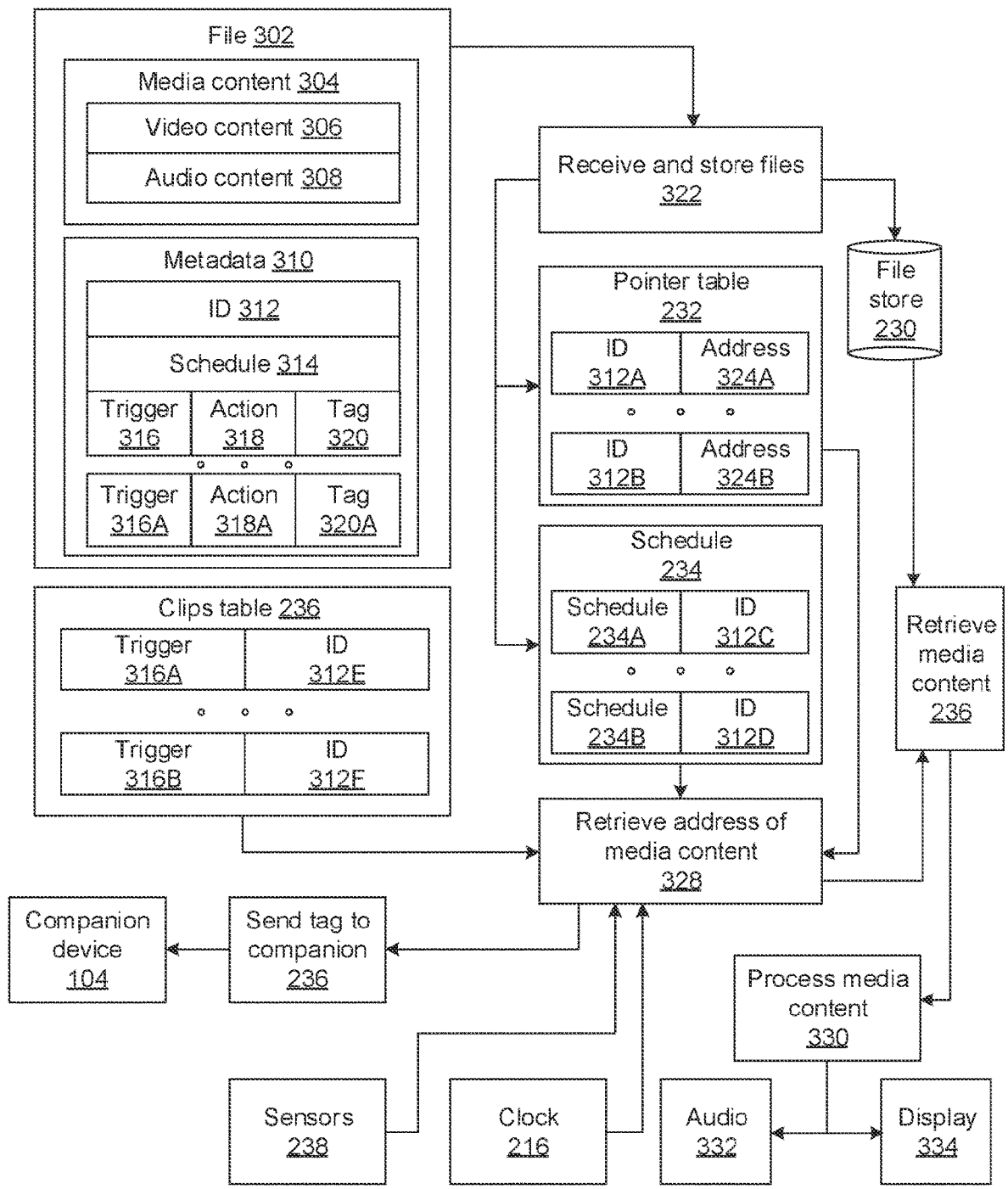
FIG. 3 is a block diagram showing processes performed on files.

The computing device can include a file storer 202. The file storer 202 can store files received from the companion device 104 in memory 228. The files received by the computing device 102 and stored by the file storer 202 can include media content, such as video content and/or audio content. The files can also include metadata. The metadata can include an identifier of the file, and a schedule indicating a time at which the media content included in the file should be played. In some examples in which the metadata of the file and/or another file indicates that the media content should be played in response to a trigger and/or a particular input, the schedule can be blank and/or null. The metadata can also include one or more triggers and associated actions and tags. The trigger can indicate an event, such as a predefined input, which will cause the computing device 102 to perform the associated action (such as playing media content), and the associated tag can indicate the file that includes the media content that will be played. An example of a file 302 received by the computing device 102 and/or file storer 202 is shown in FIG. 3.

The computing device 102 can include a pointer table generator 204. The pointer table generator 204 can map identifiers of files, which are included in the metadata of the files, to addresses in memory where the files are stored. The mapping of the identifiers to the addresses can facilitate quick retrieval of the files and/or the media content included in the files. An example of a pointer table 232 is shown in FIG. 3.

The computing device 102 can include a schedule generator 206. The schedule generator 206 can generate a schedule of files and/or media content to play. The schedule generator 206 can generate the schedule based on the schedules, which can include dates and/or times, included in the metadata of the files, and the identifiers included in the metadata of the files. The computing device 102 can play media content according to the generated schedule in absence of any communication with the companion device 104. An example of a schedule generated by the schedule generator 206 is shown in FIG. 3.

The computing device 102 can include a trigger mapper 208. The trigger mapper 208 can map triggers to files. The files can be identified by their identifiers. The trigger mapper 208 can map input to the triggers, and/or determine that input satisfies a specific trigger condition. In some examples, the triggers can be gestures on a touchscreen included in the computing device 102, input into buttons included in the computing device 102, a specific time occurring, a predetermined time period elapsing, an image being captured by a camera included in the computing device 102, a sound and/or word(s) being received by microphone included in the computing device 102, the computing device 102 arriving at and/or being at a predetermined location, and/or a temperature threshold being met. The trigger mapper 208 can map the triggers to the files, such as by checking the clips table 236 shown in FIG. 3, which maps triggers included in metadata of files to identifiers of and/or included in files. The computing device 102 can play media content based on the maps of the triggers to the files in absence of communication with the companion device 104. In some examples, the computing device 102 does not include a trigger mapper 208, and the computing device 102 receives the clips table 236 from the companion device 104.

The computing device 102 can include an address retriever 210. The address retriever 210 can retrieve addresses, in memory, of files and/or media content. The address retriever 210 can retrieve the addresses of files and/or media content based on identifiers associated with the files and/or media content by checking the pointer table, such as the pointer table 232 shown in FIG. 3.

Figure 6:
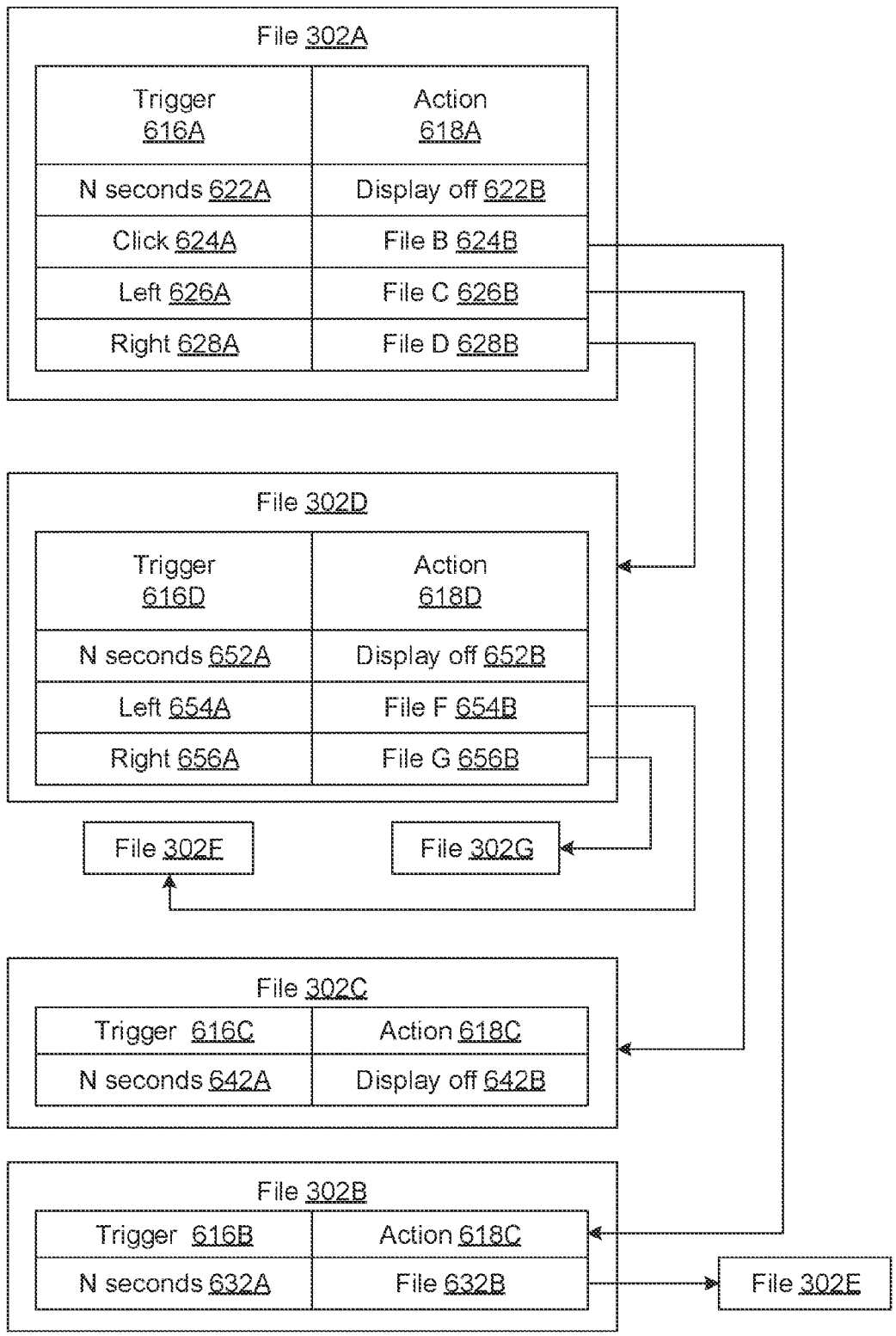
FIG. 6 is a block diagram showing files chained together.

The computing device 102 can include a chain generator 212. The chain generator 212 can map triggers to files, and/or generate a chain or graph associating triggers with actions to be performed in response to the triggers and/or media content to be played in response to the triggers. The chain generator 212 can generate the chain or graph based on associations between triggers, actions, and tags included in the metadata of the files. An example of a chain or graph is shown in FIG. 6. In some examples, the chain generator 212 can generate the chain or graph based on the clips table, such as the clips table 236 shown in FIG. 3.

The computing device 102 can include an input processor 214. The input processor 214 can process input, such as taps and/or swipes into a touchscreen included in the computing device 102, inputs into buttons included in the computing device 102, local or remote devices that can be coupled to the computing device 102 via wired or wireless interfaces such as joysticks, touchpads, or inertial measurement units (IMUs), a camera, a microphone, and/or inputs into sensors, such as a temperature sensor, a global positioning system (GPS) sensor(s), and/or an accelerometer, as non-limiting examples. The input processor 214 can provide the input to the trigger mapper 208, and/or can interpret the input as a gesture or otherwise classify the input, and provide the gesture and/or classified input to the trigger mapper 208.

The computing device 102 can include a clock 216. The clock 216 can maintain a date and/or time. The trigger mapper 208 can process input from, and/or a time maintained by, the clock 216, to determine whether a trigger condition has been met.

The computing device 102 can include a file retriever 218. The file retriever 218 can retrieve files and/or media content. The file retriever 218 can retrieve files and/or media content based on the trigger mapper 208 determining that a trigger condition has been met, and that a file and/or media content is associated with the trigger for which the trigger condition was met.

The computing device 102 can include a media processor 220. The media processor 220 can process and/or play media content, such as video content and/or audio content. The media processor 220 can process and/or play video content by displaying the video content via a display included in the computing device 102. The media processor 220 can process and/or play audio content by outputting the audio content via a speaker included in the computing device 102.

In some examples, the media processor 220 can combine multiple media streams, such as combining media content from two different files, combining media content from a file with content that is rendered locally on the computing device 102, combining media content from a file with streaming media content that the computing device 102 receives from the companion device 104, or combining media content that is rendered locally on the computing device 102 with streaming media content that the computing device 102 receives from the companion device 104, as non-limiting examples.

In some examples, the input processor 214 and media processor 220 can, based on actions associated with triggers included in a file indicating scrolling and the associated tags indicating the same file, scroll the media clip forward or backward depending on which trigger condition the input satisfies. For example, the computing device 102 could respond to contact with an upper part of the display, and/or an upward swipe on the display, by advancing the media content backward one or more frames, and/or could respond to contact with lower part of the display, and/or a downward swipe on the display, by advancing the media content forward one or more frames.

In some examples, the trigger conditions of associated files can include contact with an upper part of the display, and/or an upward swipe on the display, and the actions can include presenting media content from files further forward or backward in a chain, so that the computing device responds to the user tapping or swiping by presenting images that are further forward or backward within a continuous document.

The computing device 102 can include a tag processor 222. The tag processor 222 can map tags included in metadata to files. The tag processor 222 can map the tags included in metadata to files by mapping and/or matching the tags to the identifiers included in the metadata of other files. The tag processor 222 can send tags, and/or identifiers, of files and/or media content currently playing on the computing device 102, to the companion device 104, informing the companion device 104 of which file and/or media content is currently playing on the computing device 102.

The computing device 102 can include a transitional media player 224. The transitional media player 224 can play prerendered transition content, such as prerendered transition content 518 shown and described with respect to FIG. 5, after the media processor 220 has played and/or processed last media content in a chain and before the computing device 102 has received additional files from the companion device. The transitional media content can be media content that is independent of, and/or not referenced by, the files and/or media content stored and/or referenced in the clips table 236 and/or chain (an example of the chain is shown in FIG. 6). Playing the prerendered transitional content while waiting for the additional files from the companion device can make the transition from the last media content to playing the additional files appear seamless to the user.

The computing device 102 can include at least one processor 226. The at least one processor 226 can execute instructions, such as instructions stored in at least one memory device 228, to cause the computing device 102 to perform any combination of methods, functions, and/or techniques described herein.

The computing device 102 can include at least one memory device 228. The at least one memory device 228 can include a non-transitory computer-readable storage medium. The at least one memory device 228 can store data and instructions thereon that, when executed by at least one processor, such as the processor 226, are configured to cause the computing device 102 to perform any combination of methods, functions, and/or techniques described herein. Accordingly, in any of the implementations described herein (even if not explicitly noted in connection with a particular implementation), software (e.g., processing modules, stored instructions) and/or hardware (e.g., processor, memory devices, etc.) associated with, or included in, the computing device 102 can be configured to perform, alone, or in combination with the computing device 102, any combination of methods, functions, and/or techniques described herein.

The memory 228 can include a file store 230. The file store 230 can include files received by the computing device 102 and stored by the file storer 202. The file store 230 can also include the pointer table 232 generated by the pointer table generator 204, the schedule 234 generated by the schedule generator 206, and/or the clips table 236 received by the computing device 102 from the companion device 104.

The computing device 102 can include at least one input/output node 238. The at least one input/output node 238 may receive and/or send data, such as from and/or to, the computing device 102 and the companion device 104, and/or may receive input and provide output from and to a user. The input and output functions may be combined into a single node, or may be divided into separate input and output nodes.

Figure 2B:
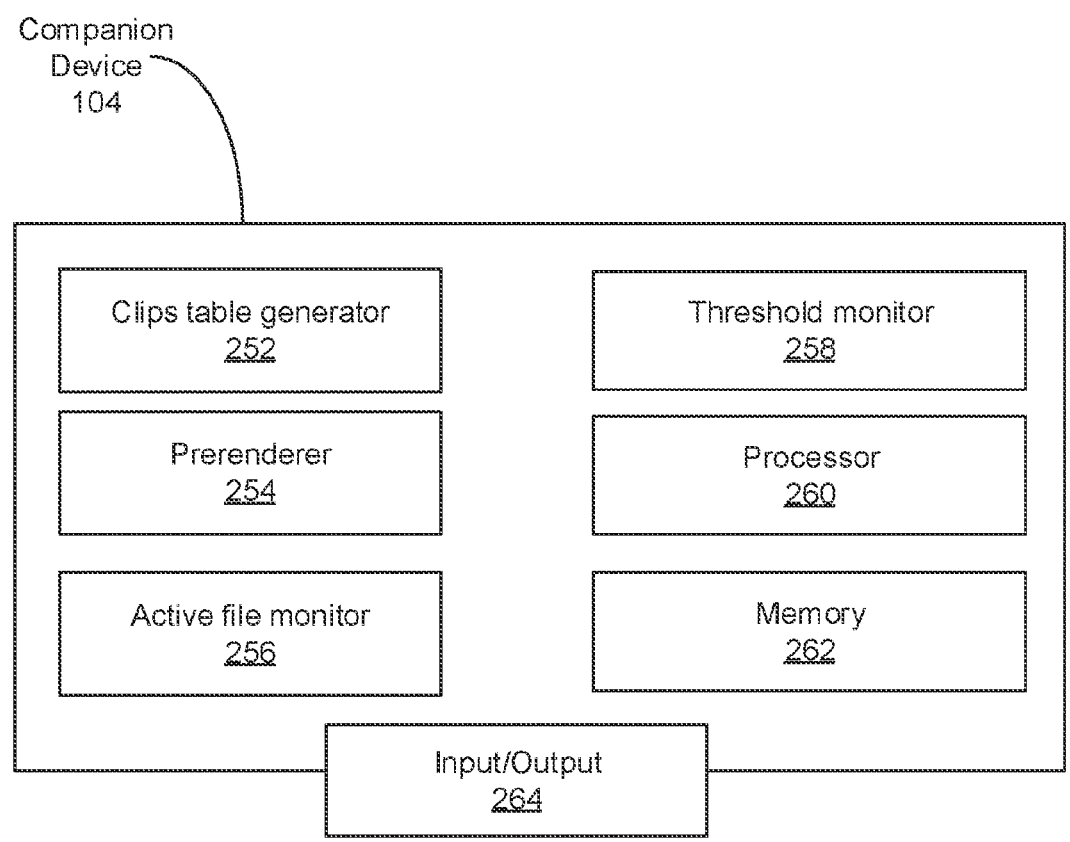
FIG. 2B is a block diagram showing the companion device.

FIG. 2B is a block diagram showing the companion device 104. The companion device 104 can send files to the computing device 102 (not shown in FIG. 2B), monitor which content and/or which file is active and/or playing on the computing device 102, and send additional files to the computing device 102 when the computing device 102 is close to running out of content to play.

The companion device 104 can include a clips table generator 252. The clips table generator 252 can map triggers to files. The files can be identified by their identifiers. The clips table generator 252 can map input to the triggers, to generate the clips table 236. In some examples, the triggers can be gestures on a touchscreen included in the computing device 102, input into buttons included in the computing device 102, a specific time occurring, a predetermined time period elapsing, an image being captured by a camera included in the computing device 102, a sound and/or word(s) being received by microphone included in the computing device 102, the computing device 102 arriving at and/or being at a predetermined location, and/or a temperature threshold being met. The companion device 104 can send the generated clips table 236 to the computing device 102.

The companion device 104 can include a prerenderer 254. The prerenderer 254 can prerender media content, such as video content and/or audio content, for transfer to, and later playing by, the computing device 102, and can store the prerendered media content in the memory 262 of the companion device 104. The prerendering by the prerenderer 254 can transform the media content into a format ready to be played and/or outputted by the computing device 102, and reduce the processing load of the computing device 102.

The companion device 104 can include an active file monitor 256. The active file monitor 256 can monitor which file, and/or media content, is active and/or playing on the computing device 102. The active file monitor 256 can store the most recent tag and/or identifier sent by the tag processor 222 of the computing device 102 and received by the companion device 104. The tag and/or identifier sent by the tag processor 222 and stored by the active file monitor 256 can indicate a file and/or media content currently playing on, and/or being outputted by, the computing device 102.

The companion device 104 can include a threshold monitor 258. The threshold monitor 258 can determine how much time the computing device 102 has to play media content until running out of media content based on the active file and/or media content playing on the computing device 102 and the clips table 236 and/or chain (an example of a chain is shown in FIG. 6). The threshold monitor 258 can compare the time until running out of media content to a threshold time. If the threshold monitor 258 determines that the time until running out of media content is equal to or less than the threshold time, then the companion device 104 can send additional files to the computing device 102.

The companion device 104 can include at least one processor 260. The at least one processor 260 can execute instructions, such as instructions stored in at least one memory device 262, to cause the companion device 104 to perform any combination of methods, functions, and/or techniques described herein.

The companion device 104 can include at least one memory device 262. The at least one memory device 262 can include a non-transitory computer-readable storage medium. The at least one memory device 262 can store data and instructions thereon that, when executed by at least one processor, such as the processor 260 are configured to cause the companion device 104 to perform any combination of methods, functions, and/or techniques described herein. Accordingly, in any of the implementations described herein (even if not explicitly noted in connection with a particular implementation), software (e.g., processing modules, stored instructions) and/or hardware (e.g., processor, memory devices, etc.) associated with, or included in, the companion device 104 can be configured to perform, alone, or in combination with the companion device 104, any combination of methods, functions, and/or techniques described herein.

The companion device 104 can include at least one input/output node 264. The at least one input/output node 264 may receive and/or send data, such as to and/or from, the computing device 102 and the companion device 104, and/or may receive input and provide output from and to a user. The input and output functions may be combined into a single node, or may be divided into separate input and output nodes.

FIG. 3 is a block diagram showing processes performed on files. An example file 302 is shown in FIG. 3. The file 302 can also be considered a container. The file 302 and/or container can include data in a predetermined format, such as a media content 304 portion and a metadata 310 portion. The computing device 102 can receive multiple files 302 from the companion device 104.

The file 302 can include media content 304. The media content 304 can include content that can be continuously played and/or outputted by the computing device 102. The media content 304 can include video content 306 and/or audio content 308. In some examples, the media content 304 includes only video content 306, and when the computing device 102 plays the media content 304 included in the file 302, the computing device 102 will play and/or output the video content 306 via a display included in the computing device 102 without any corresponding audio content. In some examples, the media content 304 includes only audio content 308, and when the computing device 102 plays the media content 304 included in the file 302, the computing device 102 will play and/or output the audio content 308 via a speaker included in the computing device 102 without any corresponding video content. In some examples, the media content 304 includes both video content 306 and audio content 308, and when the computing device 102 plays the media content 304 included in the file 302, the computing device 102 will play and/or output both the video content 306 via the display and the audio content 308 via the speaker, and the video content 306 and the audio content 308 will be synchronized with each other.

The file 302 can include metadata 310. The metadata 310 can include information about the file 302, such as information to identify the file 302, when the media content 304 included in the file 302 should be played, and/or what other actions should be taken, and when those actions should be taken, while and/or after the media content 304 included in the file 302 has been played.

The metadata 310 can include an identifier (ID) 312. The identifier 312, which can also be considered an identifier field, can serve as an identifier for the file 302. The computing device 102 can retrieve and/or process the file 302, and/or media content 304 and/or metadata included in the file 302, based on the identifier 312 included in the metadata 310 of the file 302.

In some examples, metadata 310 can include a schedule 314. The schedule 314, which can also be considered a schedule field, can indicate a time and/or date when the computing device 102 should play the media content 304 included in the file 302. In some examples, the computing device 102 can use the schedules 314 included in the metadata 310 of files 302 to form a schedule 324 for when the media content 304 of certain files 302 should be played.

The media content 304 of some files 302 is not intended to be played at specific times, but rather in response to certain triggers and/or conditions. For media content 304 that is not intended to be played at specific times, the schedule 314 can be blank and/or include a null value.

In some examples, the metadata 310 can include any number of, such as zero or more, one or more, or a plurality of, triggers 316, 316A and associated actions 318, 318A and tags 320, 320A. The trigger 316, which can also be considered a trigger field, can identify a trigger condition that will result in the associated action 318. The trigger conditions can include user input to a touch screen such as gesture including a loop click, a swipe, a swipe left, or a swipe right, user movement captured by a sensor such as an accelerometer detecting motion of the computing device 102 or a camera capturing a head nod, user input detected by a microphone such as a command word, input captured by the microphone such as a predetermined sound including a bicycle bell or a baby crying, movement of the computing device 102 detected by an accelerometer included in the computing device 102 such as a throwing motion or a falling movement, or a threshold temperature detected by a thermometer included in the computing device 102 being met, as non-limiting examples. The metadata 310 can include an action 318, which can be considered an action field, associated with each trigger 316. The action 318 can be an action that the computing device 102 will take and/or perform in response to, and/or based on, the condition of the associated trigger 316 being met. The action 318 can include playing the media content 304 of another file 302, including an indication of whether to play the media content forward or backward; turning a display included in the computing device 102 off (which may also include turning the display back on in response to user input) or turning the display on; sending data (such as data included in the tag 320) to the companion device 104; pausing the playing of the media content 304; restarting playing the media content 304; moving the media content 304 forward a specified number (such as one or more) of frames; moving the media content 304 backward a specified number (such as one or more) of frames; increasing a volume of a speaker included in the computing device 102; decreasing the volume of the speaker; setting the volume of the speaker to a specific value; taking, capturing, and/or storing a photograph captured by a camera included in the computing device; starting recording and/or streaming video captured by the computing device 102; stopping recording and/or streaming video captured by the computing device 102; starting recording and/or streaming audio detected by a microphone included in the computing device 102; stopping recording and/or streaming video audio detected by the microphone; and/or storing and/or recording a predefined time period, such as a predefined number of seconds, of captured audio and/or video data, as non-limiting examples.

The metadata 310 can include a tag 320 associated with each trigger 316 and/or action 318. When the action 318 includes playing media content 304 of another file 302, the tag 320, which can be considered a tag field, can include and/or identify the identifier 312 of another file 302 (which includes the media content 304 to play). When the action 318 includes sending data to the companion device 104, the tag 320 can include the data to send to the companion device 104, such as the identifier 312 of the file 302 currently being played so that the companion device 104 will know, and/or have information regarding, the file 302 and/or media content 304 currently playing on the computing device 102. In some examples, such as when the action 318 does not include playing media content 304 of another file 302 or sending data to the companion device 104, the tag 320 can be blank and/or include a null value.

The computing device 102 can receive and store the files 302 from the companion device (322). The computing device 102 can store the received files 302 in the file store 230. In some examples, when the computing device 102 receives files from the companion device 104, such as after playing media content 304 from some of the files 302, the computing device 102 can erase and/or delete some of the files to free memory for additional files.

The pointer table generator 204 included in the computing device 102 can generate the pointer table 232. The pointer table 232 can map identifiers 312A, 312B included in the files to addresses in memory 228, such as within the file store 230, where the files 302 are stored.

The schedule generator 206 included in the computing device 102 can generate the schedule 234. The schedule generator 206 can generate the schedule 234 by mapping the schedules 314A, 314B included in the metadata 310 of files 302 to the identifiers 312C, 312D included in the metadata of the files 302.

The computing device 102 can generate and store, and/or receive from the companion device 104 and store, the clips table 236. The clips table 236 can map triggers 316B, 316C included in the metadata of files 302 to identifiers 312E, 312F of files 302 included in the files 302. In some examples in which a file 302 includes multiple triggers 316, 316A, the clips table 236 can include multiple triggers 316B, 316C that map to a same identifier 312E, 312F of a same file 302.

In some examples, the triggers 316B, 316C included in the clips table 236 can serve as an entry into a chain of files, such as the chain shown in FIG. 6. For example, while the computing device 102 is not playing any media content, the computing device 102 could respond to input satisfying a trigger 316B, 316C condition included in the clips table 236 by playing media content included in a file identified by the identifier 312E, 312F associated with the trigger 316B, 316C for which the trigger condition was satisfied, and then performing actions 318, 318A based on satisfaction of associated triggers 316, 316A included in the file identified by the identifier 312E, 312F associated with the trigger 316B, 316C for which the trigger condition was satisfied.

In some examples, the computing device 102 does not generate the clips table 236, but merely receives the clips table 236 from the companion device 104. Receiving the clips table 236 from the companion device 104, and not generating the clips table 236, reduces the workload of the processor 226 and thereby conserves battery power in the computing device 102.

In some examples, based on the input processor 214 interpreting input from sensors 338 (which can include a touchscreen, buttons, a camera, a microphone, an accelerometer, GPS sensors, or a thermometer as non-limiting examples) that the trigger mapper 208 determines maps to an identifier 312E, 312F of a file based on the clips table 236, and/or based on a time indicated by the clock 216 matching a time in the schedule 234 that maps to an identifier 312C, 312D, the address retriever 210 of the computing device 102 can retrieve an address of media content 304 (328). The address retriever 210 can retrieve the address (328) by mapping the identifier 312C, 312D, 312E, 312F from the schedule 234 or clips table 236 to an identifier 312A, 312B in the pointer table, and returning and/or retrieving the address 324A, 324B associated with the identifier 312A, 312B.

In examples in which the action 318, 318A, which was included in the metadata 310 of the retrieved file 302 and associated with the trigger 316, 316A for which the trigger condition was met, includes playing media content, the file retriever 218 can retrieve the media content (326) identified by the tag 320, 320A associated with the trigger 316, 316 for which the trigger condition was met. The file retriever 218 can retrieve the file by mapping the identifier included in the associated tag 320, 320A to the same identifier 312A, 312B included in the pointer table 232, and retrieving the file 302 stored in memory at the address 324A, 324B associated with the identifier 312A, 312B. The media processor 220 can process the media content 304 (330) included in the retrieved file 302, such as by outputting audio (332) via a speaker(s) and/or outputting video via a display (334).

In examples in which the action 318, 318A, which was included in the metadata 310 of the retrieved file 302 and associated with the trigger 316, 316 for which the trigger condition was met, includes sending data to the companion device 104, the computing device 102 can send, to the companion device 104, the data stored in the tag 320, 320A associated with the trigger 316, 316A for which the trigger condition was met.

In some examples, the computing device 102 can send, to the companion device 104, an indication of an active file 302 on the computing device 102. The active file can indicate which media content that the computing device 102 is currently playing. The companion device 104 may have stored an indication and/or record of which files 302 are stored on the computing device 102. The companion device 104 may have generated a chain or graph similar to the chain shown in FIG. 6. Based on the chain or graph and the indication of which media content that the computing device 102 is currently playing, the companion device 104 can determine when the last media content will be played on the computing device 102. The companion device 104 can determine whether the last media content will be played, and/or will finish being played, within a threshold time. If the companion device 104 determines that the last media content will be played, and/or will finish being played, within the threshold time, then the companion device 104 can send additional files 302 to the computing device 102, so that the computing device 102 will not run out of media content 304 to play.

In some examples, the computing device 102 will not determine when the last media content will be played on the computing device 102 and/or how long media content will play until the computing device 102 has finished playing media content stored on the computing device 102. In these examples, the computing device 102 will send the companion device an indication of which media content is currently playing on the computing device 102, and the companion device 104 will determine when the last media content will be played on the computing device 102 and/or how long media content will play until the computing device 102 has finished playing media content stored on the computing device 102. In these examples, the companion device 104 will determine when to send additional files to the computing device 102. By allowing the companion device 104 to determine when to send additional files to the computing device 102, the computing device 102 reduces the workload of the processor 226, conserving battery power.

Figure 4:
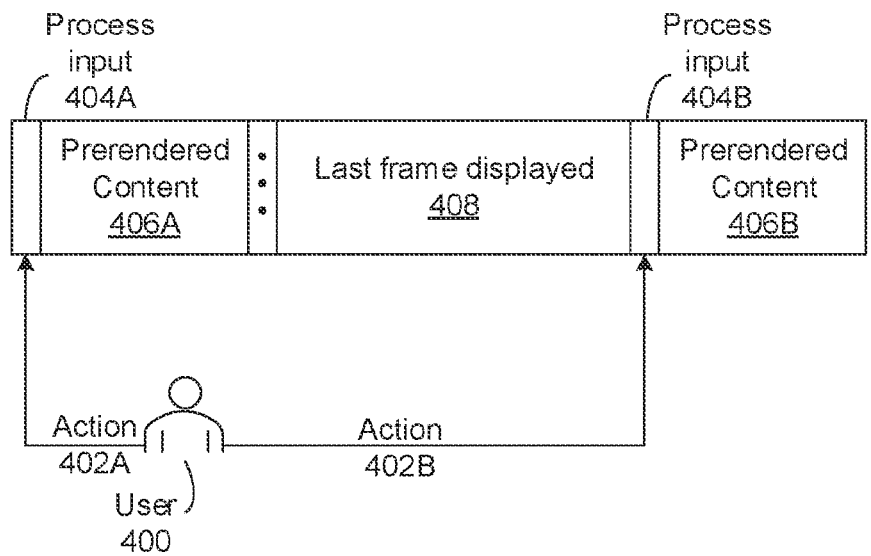
FIG. 4 is a timing diagram showing actions performed by the computing device when the computing device is not in communication with the companion device.

FIG. 4 is a timing diagram showing actions performed by the computing device 102 when the computing device 102 is not in communication with the companion device 104. The lack of communication between the computing device 102 and the companion device 104 can be caused, for example, by a distance between the computing device 102 and the companion device 104 exceeding a distance within which communication is possible, the companion device 104 being powered off, or a network error, as non-limiting examples.

Certain inputs can satisfy a trigger condition, such as a user 400 performing an action 402A such as tapping on the display of the computing device 102. The computing device 102 can process the input 404A arising from the action 402A, determine that the processed input satisfies the trigger condition, and respond to the satisfaction of the trigger condition by attempting to contact the companion device 104. The computing device 102 can respond to not receiving a response from the companion device 104 by playing stored media content, such as prerendered content 406A.

The user 400 can perform another action 402B, which the computing device 102 can process as input 404B, determine that the processed input satisfies the trigger condition, attempt to contact the companion device, and, based on not receiving a response from the companion device 104, play stored media content such as prerendered content 406B.

Figure 5:
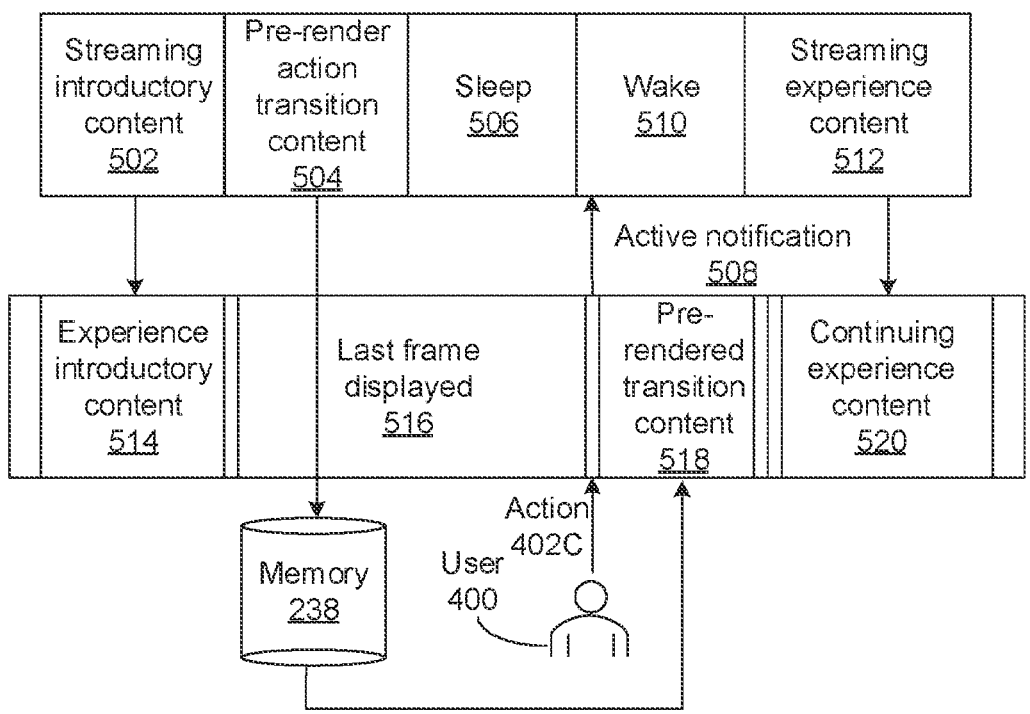
FIG. 5 is a timing diagram showing actions performed by the computing device and the companion device when the companion device takes time to wake up from a low-power state.

FIG. 5 is a timing diagram showing actions performed by the computing device 102 and the companion device 104 when the companion device 104 takes time to wake up from a low-power state. The actions (502, 504, 506, 510, 512) in the top row are performed by the companion device 104, and the actions (514, 516, 518, 520) in the bottom row are performed by the computing device 102.

In this example, the companion device 104 can send one or more, and/or multiple, prerendered transition clips and/or transitional media content to the computing device 102. After sending the prerendered transition clip(s) and/or transitional media content to the computing device 102, the companion device 104 can go to sleep and/or enter a low-power state. The prerendered transition clip(s) and/or transitional media content can give the companion device 104 time to wake up, leave the low-power state, and/or enter a higher power state and respond to a request for additional media content from the computing device 102.

The companion device 104 can send streaming introductory content (502) to the computing device 102. The computing device 102 present and/or output the streaming introductory content (502) as experiencing the introductory content (514). While the computing device is displaying a last frame (516), the companion device can prerender action transition content (504), and send the prerendered action transition content to the computing device 102. The computing device 102 can store the prerendered action transition content in memory 228. After prerendering and sending the prerendered action transition content to the computing device 102, the companion device 104 can go to sleep (506) and/or enter a low-power state.

While the companion device is asleep and/or in the low-power state, the user 400 can perform an action 402C, such as providing input including a tap or a gesture into the computing device 102. The computing device 102 can recognize the input and respond to the input by sending an action notification 508 to the companion device 104, prompting the companion device 104 to wake up, leave the low-power state, and/or enter a higher power state. While the computing device 102 is waiting for the companion device 104 to wake up (510) and send content to the computing device 102, the transitional media player 224 of the computing device 102 can play the prerendered transition content (518) that the companion device prerendered at (504). After waking up (510), the companion device 104 can resume streaming experience content (512) to the computing device 102, and the computing device 102 can continue playing the experience content (520) received from the companion device 104.

FIG. 6 is a block diagram showing files 302A, 302B, 302C, 302D, 302E, 303F, 302G chained together. The chain generator 212 of the computing device 102 can chain the files 302A, 302B, 302C, 302D, 302E, 303F, 302G together, and/or create a graph of the files 302A, 302B, 302C, 302D, 302E, 303F, 302G, based on the files identified by the tags 320, 320A included in the metadata 310 of the files 302A, 302B, 302C, 302D, 302E, 303F, 302G. The computing device 102 can perform actions 618A, 618B, 618C, 618D, 618D, such as playing the media content of another file 302A, 302B, 302C, 302D, 302E, 302E, 302F, 302F or turning the display off, based on trigger conditions 616A, 616B, 616C, 616D being met.

In the example of FIG. 6, when computing device 102 is playing the media content of a first file 302A, if the trigger of no input for N seconds 622A is met, then the computing device 102 will perform the action of turning the display off 622B. The action of turning the display off 622B is not associated with any of the other files 302B, 302C, 302D, 302E, 302F, 302G. When the media content of the first file 302A is playing, if the trigger of a click 624A on the display is met, then the computing device 102 will perform the action of playing the media content of a second file B (file 302B) 624B. When the media content of the first file 302A is playing, if the trigger condition of a left swipe 626A on the display is met, then the computing device 102 will perform the action of playing the media content of a third file C (file 302C) 626B. When the media content of the first file 302A is playing, if the trigger condition of a right swipe 628A on the display is met, then the computing device 102 will perform the action of playing the media content of a fourth file D (file 302D) 628B.

When the computing device 102 is playing the media content of the second file B (file 302B), if the trigger condition of no input for N seconds 632A is met, then the computing device 102 will perform the action of playing the media content of a fifth file E (file 302E) 632B.

When the computing device 102 is playing the media content of the third file C (file 302C), if the trigger condition of no input for N seconds 642A is met, then the computing device 102 will perform the action turning the display off 642B. The action of turning the display off 642B is not associated with any of the other files 302A, 302B, 302D, 302E, 302F, 302G.

When the computing device 102 is playing the media content of the fourth file D (302D), if the trigger condition of no input for N seconds 652A is met, then the computing device 102 will perform the action of turning the display off 652B. The action of turning the display off 652B is not associated with any of the other files 302A, 302B, 302C, 302E, 302F, 302G. When the media content of the fourth file 302D is playing, if the trigger condition of a left swipe 654A on the display is met, then the computing device 102 will perform the action of playing the media content of a sixth file F (file 302F) 654B. When the media content of the fourth file 302D is playing, if the trigger condition of a right swipe 656A on the display is met, then the computing device 102 will perform the action of playing the media content of a seventh file G (file 302G) 656B.

Figure 7:
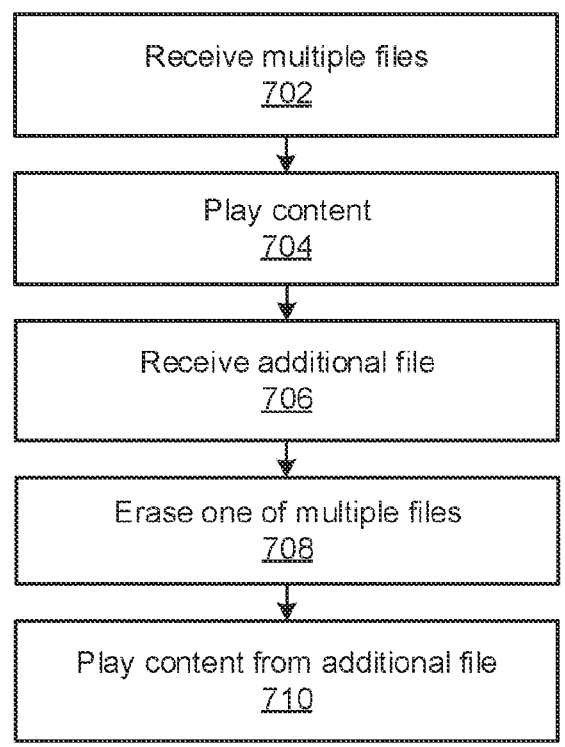
FIG. 7 is a flowchart showing a method performed by the computing device.

FIG. 7 is a flowchart showing a method performed by the computing device 102. The method can include receiving, from a companion device 104, multiple files 302 (702). Each of the multiple files 302 can include at least media content (304), a trigger condition (316), and an action (318) to be performed upon satisfaction of the trigger condition (316). The action 318 included in at least one of the files 302 can include playing media content 304 from another one of the multiple files 302. The method can include playing the media content 304 included in at least one of the multiple files 302 (704). The method can include receiving at least one additional file 302 from the companion device 304 (706). The method can include erasing at least one of the multiple files 302 (708). The method can include playing media content 304 included in the at least one additional file 302 (710).

In some examples, the mobile computing device 302 can include a smartwatch.

In some examples, the trigger condition 316 can include user input.

In some examples, the trigger condition 316 can include user input into a touchscreen included in the mobile computing device 102.

In some examples, the companion device 104 can include a smartphone.

In some examples, the method can further include playing, after playing the media content 304 included in the multiple files 302 and before receiving the at least one additional file 302, transitional media content 518, the transitional media content 518 being independent from the multiple files 302 and the at least one additional file 302.

Figure 8:
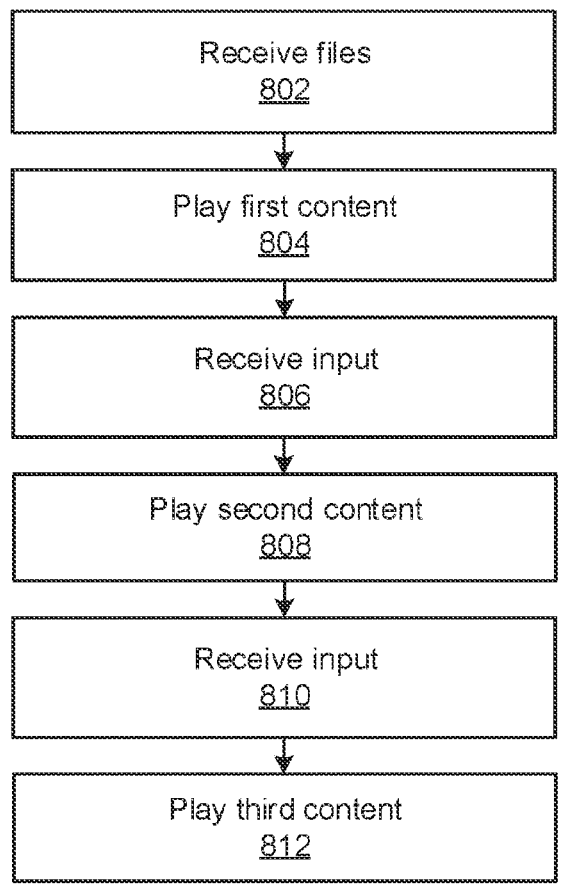
FIG. 8 is a flowchart showing a method performed by the computing device.

FIG. 8 is a flowchart showing a method performed by the computing device 102. The method can include receiving, from a companion device 104, at least a first file 302, 302A, a second file 302, 302D, and a third file 302, 302F, 302G (802). The first file 302 can include first media content 304, a first trigger field 316, 622A associated with a first action 318, 622B performed by the computing device 102, the first action 318, 622B not being associated with the second file 302, 302D or the third file 302, 302F, 302G, and a second trigger field 316, 628A associated with the second file 302, 302D, 628B. The second file 302, 302D can include second media content 304, a third trigger field 316, 652A associated with a second action 318, 652B performed by the computing device 102, the second action 318, 652B not being associated with the first file 302, 302A or the third file 302, 302F, 302G, and a fourth trigger field 316, 656A associated with the third file 302, 302F, 302G, 656B. The third file 302, 302F, 302G can include third media content 304. The method can also include playing the first media content 304 (804). The method can also include receiving input associated with the second trigger field 316 (806). The method can also include, in response to receiving input associated with the second trigger field 316, playing the second media content 304 (808). The method can also include receiving input associated with the fourth trigger field 316 (810). The method can also include, in response to receiving input associated with the fourth trigger field 316, playing the third media content 304 (812).

In some examples, the third file further can further a fifth trigger field associated with the first file and the method can further include receiving input associated with the fifth trigger field, in response to receiving the input associated with the fifth trigger field, playing the first media content, receiving input associated with the first trigger field, and in response to receiving the input associated with the first trigger field, performing the first action.

In some examples, the first action can include turning off a display included in the mobile computing device.

In some examples, the third file can further include a fifth trigger field associated with the second file, and the method can further include receiving input associated with the fifth trigger field, in response to receiving the input associated with the fifth trigger field, playing the second media content, receiving input associated with the third trigger field, and in response to receiving the input associated with the third trigger field, performing the second action.

In some examples, the second action can include turning off a display included in the mobile computing device.

In some examples, third file can further include a fifth trigger field identifying first input, the fifth trigger field being associated with a third action of the computing device, the third action including moving the third media content forward at least one frame, and a sixth trigger field identifying second input, the sixth trigger field being associated with a fourth action of the computing device, the fourth action including moving the third media content backward at least one frame.

In some examples, the method can further include requesting additional files from the companion device, and, based on not receiving a response to the request, playing at least one of the first media content, the second media content, or the third media content.

In some examples, the method can further include determining that additional files are needed, and based on determining that additional files are needed, request additional files from the companion device, and playing at least one of the first media content, the second media content, or the third media content.

In some examples, the method can further include generating a chain of media content. The chain of media content can connect the first media content to the second media content based on, the first file including the second trigger field, the second trigger field being associated with the second file, and the second file including the second media content, and the second media content to the third media content based on the second file including the fourth trigger field, the fourth trigger field being associated with the third file, and the third file including the third media content.

In some examples, the method can further include receiving a fourth file, the fourth file including fourth media content and a fifth trigger field, the fifth trigger field including a time, and playing the fourth media content at the time included in the fifth trigger field.

In some examples, the method can further include determining that last media content will be played within a threshold time, and requesting files from the companion device based on the determining that the last media content will be played within the threshold time.

Figure 9:
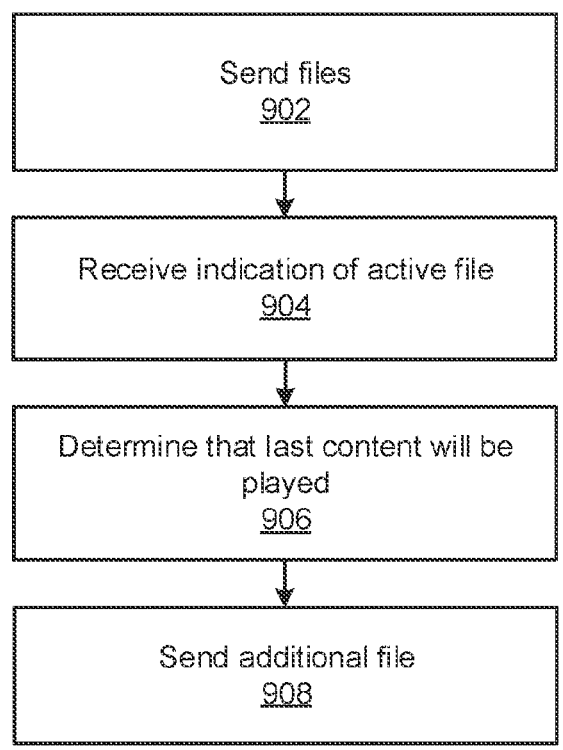
FIG. 9 is a flowchart showing a method performed by the companion device.

FIG. 9 is a flowchart showing a method performed by the companion device 104. The method can include sending, to a mobile computing device 102, at least a first file, a second file, and a third file (902). The first file can include first media content, a first trigger field associated with a first action performed by the computing device, the first action not being associated with the second file or the third file, and a second trigger field associated with the second file. The second file can include second media content, a third trigger field associated with a second action performed by the computing device, the second action not being associated with the first file or the third file, and a fourth trigger field associated with the third file. The third file can include third media content. The method can further include receiving, from the mobile computing device, an indication of an active file on the computing device (904). The method can further include determining, based on the indication of the active file and files stored on the computing device, that last media content will be played on the computing device within a threshold time (906). The method can further include, based on determining that the last media content will be played on the computing device within the threshold time, sending at least a fourth file to the computing device, the fourth file including fourth media content (908).

Figure 10:
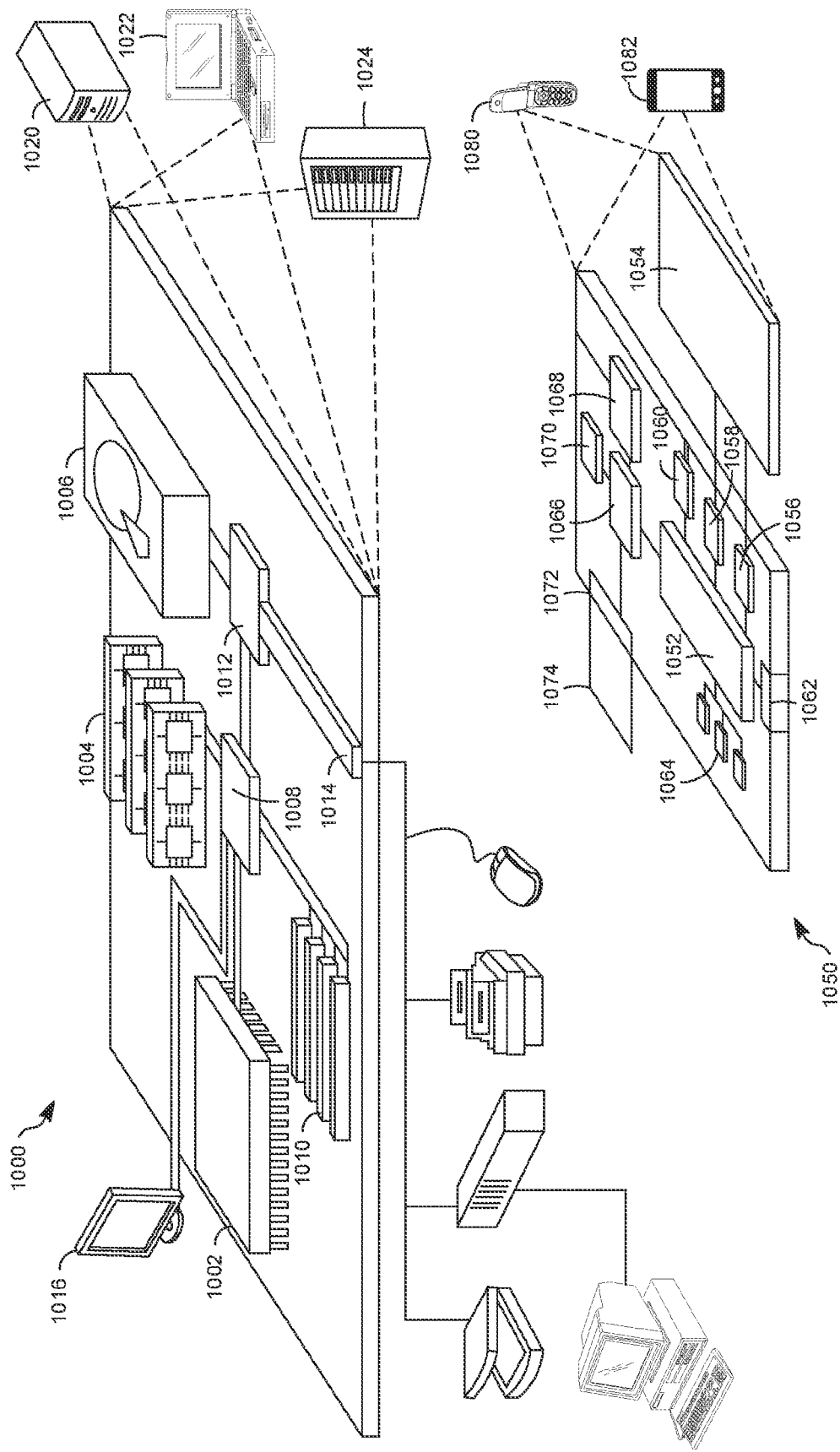
FIG. 10 shows an example of a computer device and a mobile computer device that can be used to implement the techniques described here.

FIG. 10 shows an example of a generic computer device 1000 and a generic mobile computer device 1050, which may be used with the techniques described here. Computing device 1000 is intended to represent various forms of digital computers, such as laptops, desktops, tablets, workstations, personal digital assistants, televisions, servers, blade servers, mainframes, and other appropriate computing devices. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. The processor 1002 can be a semiconductor-based processor. The memory 1004 can be a semiconductor-based memory. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provided in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A non-transitory computer-readable storage medium comprising instructions stored thereon that, when executed by at least one processor, are configured to cause a mobile computing device to:
   receive, from a companion device, multiple files, each of the multiple files including at least:
      media content;
      a trigger condition; and
      an action to be performed upon satisfaction of the trigger condition,
      wherein the action included in at least one of the multiple files includes playing media content from another one of the multiple files;
   play the media content included in at least one of the multiple files;
   in response to determining that the media content is last media content to be played on the mobile computing device, request at least one additional file from the companion device;
   receive the at least one additional file from the companion device; and
   play media content included in the at least one additional file.

2. The non-transitory computer-readable storage medium of claim 1, wherein the mobile computing device comprises a smartwatch.

3. The non-transitory computer-readable storage medium of claim 1, wherein the trigger condition includes user input.

4. The non-transitory computer-readable storage medium of claim 1, wherein the trigger condition includes user input into a touchscreen included in the mobile computing device.

5. The non-transitory computer-readable storage medium of claim 1, wherein the companion device includes a smartphone.

6. The non-transitory computer-readable storage medium of claim 1, wherein the instructions are further configured to cause the mobile computing device to play, after playing the media content included in the multiple files and before receiving the at least one additional file, transitional media content, the transitional media content being independent from the multiple files and the at least one additional file.

7. The non-transitory computer-readable storage medium of claim 1, wherein the instructions are configured to cause the mobile computing device to request the at least one additional file from the companion device in response to determining that the media content is last media content to be played on the mobile computing device within a threshold time.

8. A non-transitory computer-readable storage medium comprising instructions stored thereon that, when executed by at least one processor, are configured to cause a mobile computing device to:
   receive, from a companion device, at least a first file and a second file, the second file including second media content, wherein the first file includes:
      first media content;
      a first trigger field associated with a first action performed by the mobile computing device, the first action not being associated with the second file; and
      a second trigger field associated with the second file;
   play the first media content;
   receive input associated with the second trigger field;
   in response to receiving input associated with the second trigger field, play the second media content;
   determine that the second media content is last media content that will be played within a threshold time; and
   request a third file from the companion device based on determining that the second media content is last media content that will be played within the threshold time.

9. The non-transitory computer-readable storage medium of claim 8, wherein the first action comprises turning off a display included in the mobile computing device.

10. The non-transitory computer-readable storage medium of claim 8, wherein the first action comprises turning off a display included in the mobile computing device.

11. The non-transitory computer-readable storage medium of claim 8, wherein the instructions are further configured to cause the mobile computing device to:
   request additional files from the companion device; and
   based on not receiving a response to the request, play at least one of the first media content, the second media content, or a third media content.

12. The non-transitory computer-readable storage medium of claim 8, wherein the instructions are further configured to cause the mobile computing device to:
   determine that additional files are needed; and
   based on determining that additional files are needed:
      request additional files from the companion device; and
      play at least one of the first media content, the second media content, or a third media content.

13. The non-transitory computer-readable storage medium of claim 8, wherein the instructions are further configured to cause the mobile computing device to generate a chain of media content, the chain of media content connecting:
   the first media content to the second media content based on:
      the first file including the second trigger field;
      the second trigger field being associated with the second file; and
      the second file including the second media content; and
   the second media content to a third media content based on:
      the second file including a fourth trigger field;
      the fourth trigger field being associated with a third file; and
      the third file including the third media content.

14. A non-transitory computer-readable storage medium comprising instructions stored thereon that, when executed by at least one processor, are configured to cause a companion device to:
   send, to a mobile computing device, at least a first file, a second file, and a third file, wherein:
      the first file includes:
         first media content;
         a first trigger field associated with a first action performed by the mobile computing device, the first action not being associated with the second file or the third file; and
         a second trigger field associated with the second file;
      the second file includes:
         second media content;
         a third trigger field associated with a second action performed by the mobile computing device, the second action not being associated with the first file or the third file; and
         a fourth trigger field associated with the third file; and
      the third file includes third media content;
   receive, from the mobile computing device, an indication of an active file on the mobile computing device;
   determine, based on the indication of the active file and files stored on the mobile computing device, that last media content will be played on the mobile computing device within a threshold time; and
   based on determining that the last media content will be played on the mobile computing device within the threshold time, send at least a fourth file to the mobile computing device, the fourth file including fourth media content.

15. The non-transitory computer-readable storage medium of claim 14, wherein the instructions are further configured to cause the companion device to:
   generate a table, the table associating the second trigger field with an identifier of the second file and associating the fourth trigger field with an identifier of the third file; and
   send the table to the mobile computing device.

16. A mobile computing device comprising:
   at least one processor; and
   a non-transitory computer-readable storage medium comprising instructions stored thereon that, when executed by at least one processor, are configured to cause the mobile computing device to:
      receive, from a companion device, at least a first file and a second file, the second file including second media content, wherein the first file includes:
         first media content;
         a first trigger field associated with a first action performed by the mobile computing device, the first action not being associated with the second file; and
         a second trigger field associated with the second file;
      play the first media content;
      receive input associated with the second trigger field;
      in response to receiving input associated with the second trigger field, play the second media content;
      determine that the second media content is last media content that will be played within a threshold time; and request a third file from the companion device based on the determining that the second media content is last media content that will be played within the threshold time.

17. The mobile computing device of claim 16, wherein the mobile computing device comprises a smartwatch.

\* \* \* \* \*